Patented Mar. 9, 1954

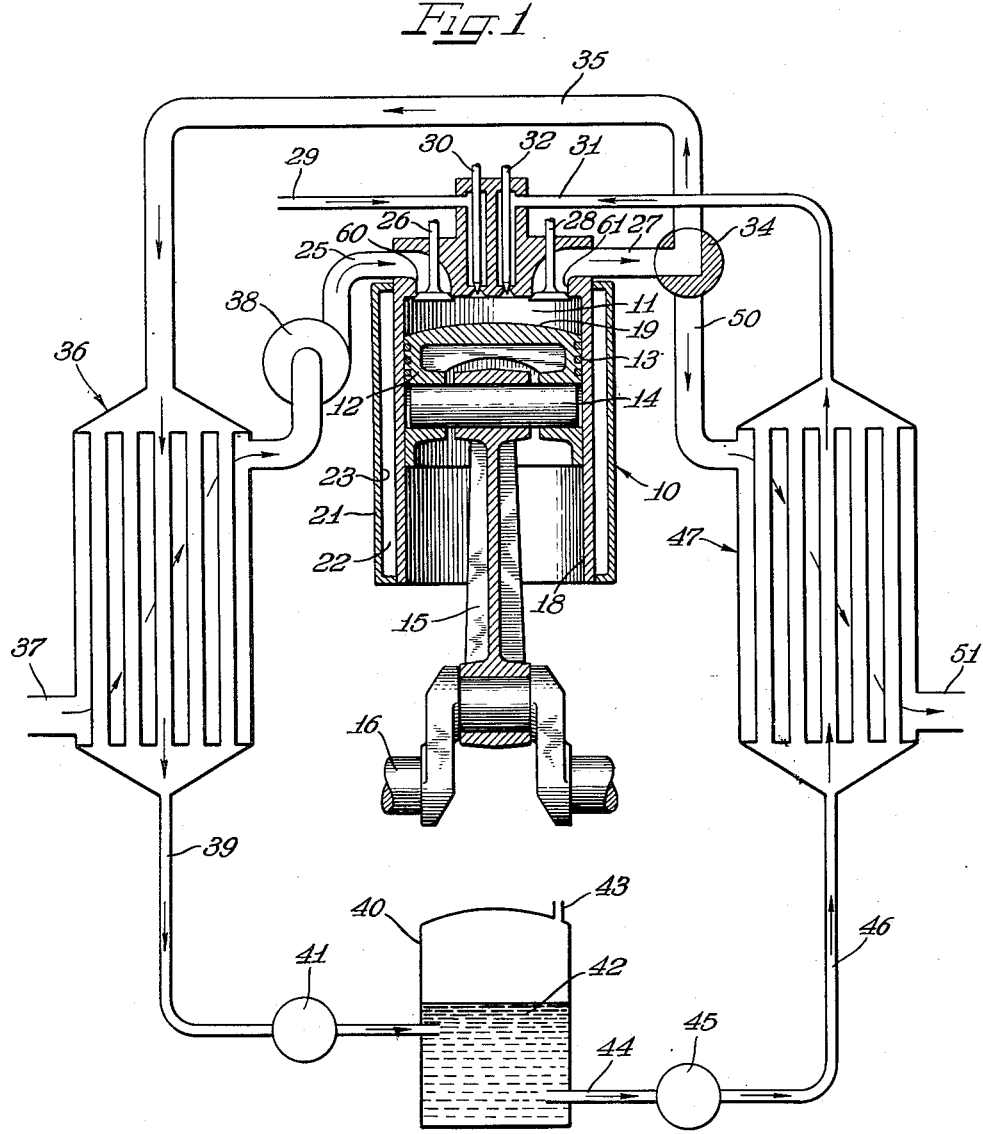

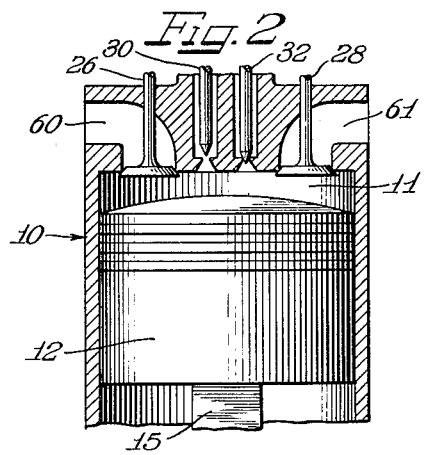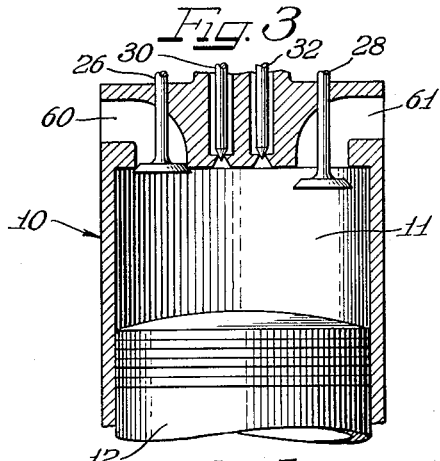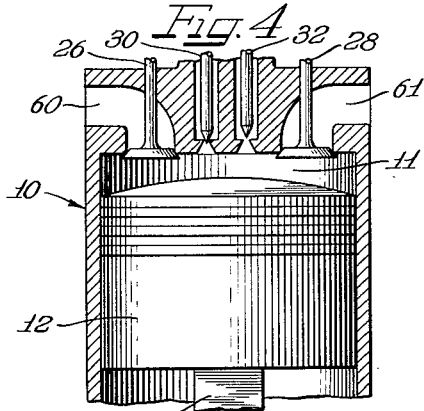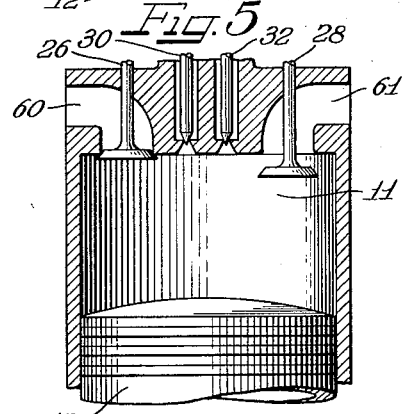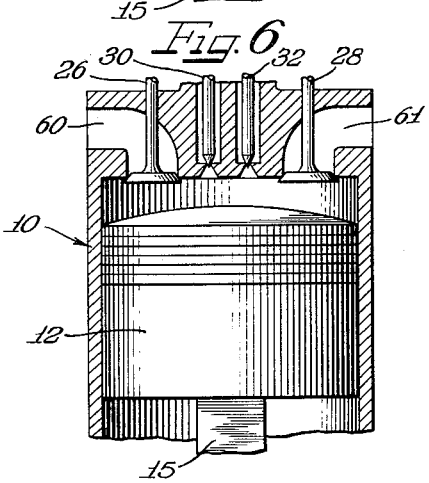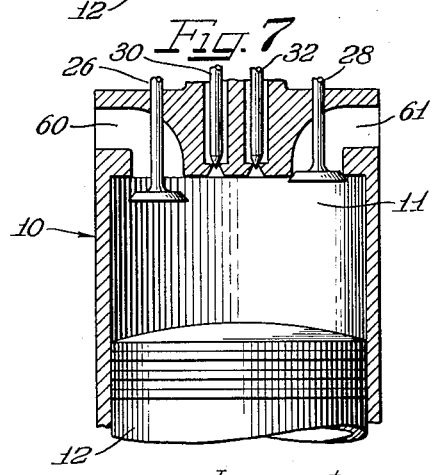
Inventor
Hans Rohrbach

2,671,311

UNITED STATES PATENT OFFICE

2,671,311

ENGINE HAVING ALTERNATE INTERNAL-COMBUSTION AND FLUID PRESSURE POWER STROKES

Hans Rohrbach, Reichenau Tamins, Switzerland, assignor of one-third to Joe Reilly, Elmhurst, Ill., and one-third to Otto Brenneman, Bartlett, Ill.

Application March 16, 1951, Serial No. 215,885

7 Claims. (Cl. 60—16)

The present invention relates to a method of generating power and to an improved engine assembly.

In ordinary combustion engines, whether gasoline engines operating on conventional cycles or diesel engines, a large percentage of the heat generated by the combustion of the fuel is lost and does no useful work. In fact, means are ordinarily provided for dissipating the heat generated in the combustion space as quickly as possible to prevent overheating the cylinder walls. Ordinarily, about 30 to 35% of the heat liberated upon combustion of fuel is dissipated after combustion with the result that combustion engines do not attain efficiency higher than about 30%, calculated on the available heat.

In the present invention, means are provided for recovering useful work from the heat of the combustion gases while at the same time preventing overheating of the cylinder walls during operation of the engine.

Basically, the engine of the present invention is a modified diesel-type engine in which work is derived from the combustible fuel, and in which a liquid coolant material is periodically injected into the combustion chamber. The coolant serves the dual function of cooling the combustion chamber by the evaporation of the liquid into the form of vapor and secondly, the rapid expansion of the liquid coolant due to the heat of the combustion chamber itself furnishes power for a second work stroke.

Contrary to ordinary practice, the combustion chamber of the improved engine is not provided with heat dissipating means, but is provided with thermal insulation to retain as much of the heat as possible in the combustion chamber. The heat present in the chamber is then adequate to vaporize the liquid coolant rapidly upon injection thereof into the chamber to provide the second work stroke by expansion of the coolant.

While several modified procedures are possible in the method of the present invention, as will be hereinafter explained, in the preferred embodiment of the invention, the first cycle of operation of the engine involves the combustion of a combustible fuel in the cylinder to do work upon the reciprocating piston contained therein. The residual gases resulting from combustion, consisting primarily of non-condensable gases are then at least partially vented into heat exchange relationship with a liquid coolant material such as water. In this heat exchanger, the water is under substantial pressure, and is raised by the heat exchange to a temperature well above its boiling point at atmospheric pressure while still remaining in liquid phase. The superheated liquid water is then injected into the combustion space, and due to the high heat content of the combustion space is rapidly volatilized into a substantially dry steam. By the term "superheated" as used in this specification, I mean that the temperature and pressure on the coolant are sufficient to keep the coolant substantially in liquid phase, so that upon injection of the coolant into the combustion space, the liquid is rapidly volatilized due to the change in temperature and pressure conditions prevailing in the combustion space. This volatilization serves to cool the surfaces of the piston and cylinder and thereby neutralize the deleterious effects ordinarily associated with too high a temperature in the cylinder.

At the same time, a rapid volatilization of the coolant water into steam supplies enough pressure against the piston head to force the piston downwardly in another work stroke. The exhaust steam and any residual combustion gases present are passed into heat exchange relationship with fresh air before introduction of the air into the combustion chamber. A substantial amount of the heat contained in these exhaust gases is thus recovered to serve the very useful function of preheating the inlet air. During this heat interchange, the steam exhausted from the combustion chamber is condensed into water and passed by a suitable pump into an air separator where air and other gases remaining in the condensed liquid are vented. The liquid remaining in the air separator unit is then pressured by a suitable pump and passed into heat exchange relationship with the combustion gases to superheat the liquid coolant prior to its injection into the combustion space, as previously explained.

Thus, the power generating system of the present invention provides a closed system for coolant material since the coolant exhausted from the combustion space is ultimately recovered, repressured, and recycled into the combustion chamber. In this manner, the loss of coolant is practically negligible.

An object of the present invention is to provide a method of generating power in which the heat contained in the combustion gases of a combustion engine is recovered to do useful work.

Another object of the present invention is to provide a method for generating power in which a liquid coolant is injected directly into a combustion chamber to cool the chamber while at the same time providing a second work stroke by the expansion of the coolant.

Still another object of the present invention is to provide a method for generating power in a modified diesel-type engine.

Another object of the present invention is to provide a method for increasing the efficiency of combustion engines.

Still another object of the present invention is to provide a power generating system containing means for generating power due to the combustion of a combustible fuel alternating with work strokes derived from the expansion of a liquid coolant material.

Another object of the present invention is to provide a modified diesel engine with an auxiliary steam generating system to provide additional power strokes in the diesel engine.

Another object of the present invention is to provide a diesel engine of substantially increased efficiency.

Another object of the invention is to provide an internally cooled combustion engine in which the coolant passes through a closed circulating system, thereby minimizing losses of the coolant material.

For a further explanation of the method and apparatus of the present invention, reference is made to the attached sheets of drawings in which:

On the drawings:

Figure 1 is a schematic representation of the power generating system of the present invention illustrating the components thereof and the flow of the various streams through the system;

Figure 2 is a fragmentary view of the combustion chamber illustrating the position of the elements during injection of fuel in the chamber;

Figure 3 is a fragmentary view similar to Figure 2 and illustrating the condition of the combustion chamber after combustion of the fuel during the return stroke of the piston;

Figure 4 is a fragmentary view illustrating the condition where the liquid coolant material is injected into the combustion chamber;

Figure 5 is a fragmentary view of the combustion chamber at the time the expansion of the coolant has provided a second work stroke;

Figure 6 is a fragmentary view similar to the aforementioned views illustrating the condition of the combustion chamber at the end of the cycle in which the vaporized coolant material has been exhausted; and Figure 7 is a fragmentary view of the combustion chamber illustrating the introduction of air into the chamber prior to injection of fuel as shown in Figure 2.

As shown on the drawings:

The system shown in Figure 1 includes a cylinder assembly 10 whose hollow interior defines a combustion chamber 11. A relatively small piston 12, provided with piston rings 13 engaging the walls of the cylinder 10, is mounted for reciprocation within the cylinder 10. The piston 12 carries a wristpin 14, the latter being coupled by means of a connecting rod 15 to the engine crankshaft 16, as shown.

The inner walls of the cylinder 10, generally indicated at 18, are preferably provided with good heat conducting surfaces, as by electroplating or depositing a thin layer of copper on the surfaces. Alternatively, the cylinder assembly 10 can be provided with a copper bushing in which the piston 12 reciprocates.

To minimize the possibility of oxidation of the piston head during operation of the engine, the piston head 19 is preferably provided with a corrosion-resistant coating, such as chromium plating.

One of the features of the present invention resides in providing heat insulating means to retain as much of the heat of the combustion gases in the combustion area as possible. In the assembly shown in Figure 1, the heat insulating means includes a jacket 21 which surrounds the combustion chamber, leaving an evacuated space 22 between the walls of the jacket 21 and the walls of the cylinder 10. The inner surface of the jacket 21, indicated at 23 may also be provided with a silver coating to minimize heat radiation losses. In effect, then, the combination of the outer jacket 21, the silver-coated surface on the wall 23 and the evacuated space 22 are arranged to preserve the heat within the combustion chamber in the same manner that a thermos bottle preserves the heat of its contents.

The combustion space 11 is supplied with air by means of a conduit 25, through an inlet port 60, the control of the flow of air being maintained by means of a valve element 26 bottomed against the cylinder wall. An exhaust port 61 communicates with an exhaust conduit 27 which together with an exhaust valve 28 exhausts the combustion gases and vaporized coolant from the combustion space 11 after the various work strokes.

A conduit 29 supplies a combustible fuel to the combustion chamber, the supply of fuel being regulated by a needle valve element 30. Another conduit, 31, supplies a pressured liquid coolant into the system, the control of the flow of the coolant material being governed by another needle valve element 32.

The flow of the gases exhausted from the combustion chamber 11 is regulated by means of a two-way valve 34 in the exhaust conduit 27. In the position of the valve 34 illustrated in Figure 1, steam, or other volatilized coolant exhausted from the combustion chamber 11 is passed by means of a steam escape line 35, in the direction of the arrows, to a condenser assembly indicated at 36. In the condenser 36, the steam passes into countercurrent heat exchange relationship with a supply of fresh air being directed into the condenser 36 from an inlet port 37. Due to the exchange of heat between the relatively cool air and hot steam in the condenser 36, the steam is condensed and the air is substantially heated prior to introduction into the combustion chamber. The air after passage through the condenser 36 is passed into a supercharger 38 which further compresses and heats the air prior to its introduction into the combustion chamber 11 by means of the conduit 25.

The condensate resulting from the condensation of the steam in the condenser 36 is passed by means of a conduit 39 into an air separator unit 40 by the action of a condensate pump 41. In the air separator 40 the condensate forms a liquid reservoir 42, while air, or other noncondensable gases contained in the steam leaving the combustion chamber 11 are vented to the atmosphere by means of a vent 43.

The liquid 42 present in the air separator is continuously withdrawn therefrom through a conduit 44 by means of a water pump 45. This pump pressures the liquid water to a relatively high superatmospheric pressure on the order of 100 atmospheres. The pressured water then is pumped through a conduit 46 into a heat exchanger 47, where its temperature is raised to a point well above its boiling point at atmospheric pressure. A typical value for the temperature of the water leaving the heat exchanger 47 is in the vicinity of 300° C. The superheated liquid water leaving the heat exchanger 47 is then introduced into the combustion chamber during an appropriate portion of the cycle by means of the conduit 31 and valve element 32.

Heat exchange is effected in the heat exchanger 47 by passing the pressured water into countercurrent heat exchange relationship with the non-condensable exhaust gases produced in the combustion chamber 11 during combustion of the fuel. These gases are directed through the exhaust conduit 27, and when the valve 34 has been rotated at 90° in a counter-clockwise direction from the position shown in Fig. 1, through a line 50 into the heat exchanger 47. During the heat exchange process, the water, as previously mentioned, is heated to a temperature of about 300° C. while the exhaust gases may be cooled by about 100° C. After such cooling, the gases are vented through an exhaust port 51 in the heat exchanger 47.

The timing of the engine and the time of introduction of the fuel, introduction of coolant, and exhaust of the gases may be varied considerably. Thus, it will not always be essential that each work stroke from the combustion of fuel be followed by an injection of coolant material. In other words, several work strokes can be had from the fuel combustion before injection of the coolant material, if the conditions in the cylinder permit such high temperature operation. The alternate injection of fuel and coolant is, however, preferred, and it is this embodiment which is illustrated in Figures 2–7.

In the system shown in Fig. 2, the air inlet valve 26 closes the air inlet port 60 and the exhaust valve 28 closes the exhaust port 61. The combustion chamber 11 contains a supply of heated air which has previously been compressed by the motion of the piston 12 into its top dead center position illustrated in Fig. 2. In this position, fuel is introduced into the combustion space 11 by opening of the needle valve element 30. During this cycle, the needle valve 32 governing the introduction of superheated water, is, of course, closed.

As the fuel is introduced into the combustion chamber 11, it forms an explosive mixture with the air previously introduced and becomes detonated by the heat contained within the combustion chamber. The resulting rapid expansion of the combustion gases thereupon forces the piston 12 downwardly to its bottom dead center position illustrated in Fig. 3. Near the time the piston 12 reaches its bottom dead center position the exhaust valve 28 is opened, permitting the combustion gases to escape from the combustion chamber 11 through the exhaust port 61. These gases are then vented by means of the conduit 50 (Fig. 1) into heat exchange relationship with the superheated water being pumped into the heat exchanger 47 to superheat the water and to recover some of the sensible heat of the exhaust gases.

In the next cycle of the operation, illustrated in Fig. 4, the piston 12 is in its upper dead center position after exhausting the gases through the exhaust port 61. In this position, the needle valve 32 is opened to inject superheated water into the combustion chamber 11. Because the combustion chamber is well insulated, it retains enough heat from the combustion cycle to volatilize rapidly the superheated water entering the combustion chamber. As a result, steam is generated immediately upon entering the combustion chamber and the steam exerts a sufficient pressure to force the piston 12 downwardly in another work stroke. After this work stroke, as illustrated in Fig. 5, the piston 12 is in its lower dead center position. At this time, the needle valve 32 has been closed and the exhaust valve 28 is opened to exhaust the residual steam from the combustion chamber. The steam does not condense within the chamber because of the large amount of heat stored in the combustion chamber, even though some of this heat is absorbed in volatilizing the liquid water into steam. The steam, air, and any residual non-condensable gases are vented during this cycle by means of the valve 34 (Fig. 1) through the conduit 35 and into the condenser 36 where the steam is condensed by heat exchange with the relatively cool air supply being introduced into the condenser 36.

After completion of the steam exhaust stroke, each of the valves is closed, as illustrated in Fig. 6, and also illustrated in Fig. 1. During the next downward stroke of the piston 12, compressed air is injected into the inlet port 60 from the supercharger 38, upon the opening of the air inlet valve 26. This condition is illustrated in Fig. 7 of the drawings. During the next upward stroke of the piston 12, the hot air is further compressed prior to the introduction of fuel through the fuel inlet system, as illustrated in Fig. 2. This, then, completes the cycle in which the engine is first operated by a fuel combustion stroke and subsequently by a steam expansion stroke.

Various modifications can be made in the method of operating the engine previously described. For example, in the stroke during which the combustion gases are exhausted, all of the combustion gases need not be exhausted, and the exhaust valve 28 may be opened only momentarily during the upward stroke of the piston. Under these conditions, superheated water is injected into the hot combustion gases during the water injection cycle.

Further, the engine can be operated with only a single exhaust stroke, by keeping the exhaust valve 28 entirely closed after the initial combustion stroke. All of the combustion gases will then be compressed upon the upward movement of the piston and commingled with the vaporized steam after the injection of superheated water. The mixture of steam and combustion gases is then exhausted after the steam expansion stroke, as illustrated in Fig. 5.

Nor is it necessary that the intake valve 32 for the coolant be opened precisely when the piston 12 reaches its upper dead center position. The engine can be timed so that the coolant is injected when the piston is in its bottom dead center position so that the vaporizing water will absorb heat from the entire cylinder area rather than from the region immediately adjacent the cylinder head.

In addition, superheated water is not the only coolant material which could be employed. Coolants such as ammonia, alcohol, ether, and even liquid air could also be employed.

The design of the cylinder can also be varied within limits. When thin wall cylinders are employed, a higher efficiency results because the cylinder can attain higher temperatures more rapidly and thereby provide for more rapid generation of steam within the combustion chamber. However, when using thin walled cylinders, the amount of steam generated is comparatively small. When using relatively heavy walled cylinders, more fuel injections can be made between each injection of the coolant because the cylinder walls can absorb more heat and accordingly produce a greater amount of steam.

It will be noted that operation in the manner previously described, when only one exhaust stroke is used to exhaust the mixture of burned gases and steam, results in the operation of the engine as a three cycle engine because there are two work strokes for every six strokes of the piston. This system has the advantage that the exhaust is rendered practically smokeless because of the steam present in the exhaust gases. When using this system, means are provided to condense the steam present in the exhaust gases after heat exchange with the superheated water. Otherwise, the system is the same as that illustrated in Fig. 1 in that the exhaust gases are alternately vented to preheat the air and then to heat the water under pressure entering the combustion chamber.

It will be evident that various modifications and variations may be effected without departing from the scope of the novel concepts of the present invention.

I claim as my invention:

1. In a power generating system, a combustion chamber, a piston reciprocable in said combustion chamber, means for introducing a combustible fuel into said chamber, air inlet means associated with said combustion chamber, gas exhaust means associated with said combustion chamber, a condenser, a heat exchanger, means for selectively directing a condensable exhaust gas from said gas exhaust means into said condenser and a non-condensable gas mixture into said heat exchanger, means for introducing air into said condenser to heat said air by heat exchange with the condensable gases being condensed therein, means for directing the condensate from said condenser into heat exchange relationship with said non-condensable gases flowing through said heat exchanger, and means for introducing the heated condensate from said heat exchanger into said combustion chamber.

2. In a power generating system, a combustion chamber, heat insulating means disposed about said combustion chamber, a piston reciprocable in said chamber, means for introducing a combustible fuel in said chamber, air inlet means associated with said combustion chamber, gas exhaust means associated with said combustion chamber, a condenser, a heat exchanger, means for selectively directing a condensable exhaust gas from said gas exhaust means into said condenser and a non-condensable gas mixture into said heat exchanger, means for introducing air into said condenser to thereby heat said air by heat exchange with the condensable gases being condensed therein, means for directing the condensate from said condenser into heat exchange relationship with said non-condensable gases flowing through said heat exchanger, and means for introducing the heated condensate from said heat exchanger into said combustion chamber.

3. In a power generating system, a combustion chamber, heat insulating means disposed about said combustion chamber, a piston reciprocable in said chamber, means for introducing a combustible fuel in said chamber, air inlet means associated with said combustion chamber, gas exhaust means associated with said combustion chamber, a condenser, a heat exchanger, means for selectively directing a condensable exhaust gas from said gas exhaust means into said condenser and for directing a non-condensable exhaust gas from said combustion chamber to said heat exchanger, means for introducing air into said condenser to heat said air by heat exchange with the fluid flowing through said condenser, means for directing the heated air into said air inlet means, means for pressuring the condensate from said condenser, means for directing the condensate into said heat exchange zone into heat exchange relationship with the non-condensable gases flowing therethrough, and means for introducing the heated condensate from said heat exchanger into said combustion chamber.

4. In a power generating system, a combustion chamber, a heat insulating means disposed about said combustion chamber, a piston reciprocable within said chamber, means for introducing a combustible fuel into said chamber, air inlet means associated with said combustion chamber, means for introducing a combustible fuel into said chamber, air inlet means associated with said combustion chamber, gas exhaust means associated with said chamber, a condenser, a heat exchanger, means for selectively directing a condensable exhaust gas from said gas exhaust means into said condenser and for directing a non-condensable exhaust gas into heat exchanger, means for introducing air into said condenser to heat said air by heat exchange with the the fluid flowing through said condenser, means for directing heated air into said air inlet means, means for pressuring the condensate leaving said condenser, means for separating condensable gases from said condensate, means for directing the condensate into said heat exchange zone into heat exchange relationship with the non-condensable gases flowing therethrough, and means for introducing the heated condensate from said heat exchanger into said combustion chamber.

5. In a power generating system, a combustion chamber, a heat insulating jacket about said chamber, said jacket being spaced from said chamber to provide an evacuated passage between said jacket and the walls of said chamber, a piston reciprocable in said combustion chamber, means for introducing a combustible fuel into said chamber, air inlet means associated with said combustion chamber, gas exhaust means associated with said combustion chamber, a condenser, a heat exchanger, means for selectively directing a condensable exhaust gas from said gas exhaust means into said condenser and a non-condensable gas mixture from said chamber to said heat exchanger, means for introducing air into said condenser to heat said air by heat exchange with the condensable gases being condensed therein, means for directing the condensate from said condenser into heat exchange relationship with said non-condensable gases flowing through said heat exchanger, and means for introducing the heated condensate from said heat exchanger into said combustion chamber.

6. In a power generating system, a combustion chamber, a heat-insulating jacket about said chamber, said jacket being spaced from said chamber to provide an evacuated passage between said jacket and the walls of said chamber, a piston reciprocable in said chamber, means for introducing a combustible fuel into said chamber, air inlet means associated with said combustion chamber, gas exhaust means associated with said chamber, a condenser, a heat exchanger, means for selectively directing a condensable exhaust gas from said gas exhaust means into said condenser and for directing a non-condensable exhaust gas into said heat exchanger, means for introducing air into said condenser to heat said air by heat exchange with the fluid flowing through said condenser, means for directing the heated air into said air inlet means, means for pressuring the condensate leaving said condenser, means for directing the condensate into said heat exchanger and into heat exchange relationship with the non-condensable gases flowing therethrough, and means for introducing the heated condensate from said heat exchanger into said combustion chamber.

7. In a power generating system, a combustion chamber, a heat insulating jacket about the chamber, said jacket being spaced from said chamber to provide an evacuated passage between said jacket and the walls of said chamber, a piston reciprocable within said chamber, means for introducing a combustible fuel into said chamber, air inlet means associated with said combustion chamber, gas exhaust means associated with said chamber, a condenser, a heat exchanger, means for selectively directing a condensable exhaust gas from said gas exhaust means into said condenser and for directing a non-condensable exhaust gas into said heat exchanger, means for introducing air into said condenser to heat the air by heat exchange with the fluid flowing through the condenser, means for directing the heated air into said air inlet means, means for pressuring the condensate leaving said condenser, means for separating non-condensable gases from said condensate, means for directing the condensate into said heat exchanger into heat exchange relationship with the non-condensable gases flowing therethrough, and means for introducing the heated condensate from said heat exchanger into said combustion chamber.

HANS ROHRBACH.

References Cited in the file of this patent

UNITED STATES PATENTS

| Number | Name | Date |
|---|---|---|
| 885,820 | Winand et al. | Apr. 28, 1908 |
| 1,332,633 | Parrish | Mar. 2, 1920 |
| 1,339,176 | Dyer | May 4, 1920 |
| 1,509,622 | Trent | Sept. 23, 1924 |
| 1,682,307 | Porter | Aug. 28, 1928 |
| 2,057,075 | Wuehr | Oct. 13, 1936 |
| 2,202,480 | Campbell | May 28, 1940 |

FOREIGN PATENTS

| Number | Country | Date |
|---|---|---|
| 261,084 | Great Britain | Nov. 11, 1926 |